US006964208B2

(12) United States Patent
Karrip et al.

(10) Patent No.: US 6,964,208 B2
(45) Date of Patent: Nov. 15, 2005

(54) MEASURING DEVICE FOR WOOD CUTTING TOOL

(76) Inventors: John K. Karrip, 273 Jefferson, Newaygo, MI (US) 49337; Gene A. Pless, Jr., 9117 Fox St., Hesperia, MI (US) 49421

(*) Notice: Subject to any disclaimer, the term of this patent is extended or adjusted under 35 U.S.C. 154(b) by 132 days.

(21) Appl. No.: 10/375,307

(22) Filed: Feb. 27, 2003

(65) Prior Publication Data
US 2003/0164052 A1 Sep. 4, 2003

Related U.S. Application Data
(60) Provisional application No. 60/360,811, filed on Mar. 1, 2002.

(51) Int. Cl.[7] ............................................. G01N 19/00
(52) U.S. Cl. ...................................................... 73/865.9
(58) Field of Search ............................. 73/865.8, 865.9, 73/866.1

(56) References Cited

U.S. PATENT DOCUMENTS

| | | | | |
|---|---|---|---|---|
| 4,058,150 A | * | 11/1977 | Pennington | 144/1.1 |
| 5,105,698 A | * | 4/1992 | Dunham | 83/155 |
| 6,202,721 B1 | * | 3/2001 | Stegmaier | 144/230 |
| 6,730,007 B2 | * | 5/2004 | Pallmann | 483/1 |

* cited by examiner

Primary Examiner—Max Noori
(74) Attorney, Agent, or Firm—Price, Heneveld, Cooper, DeWitt & Litton, LLP

(57) ABSTRACT

A measuring device for setting up powered wood tools and the like includes an elongated body defining a straight edge adapted to abuttingly support the measuring device on a bed of the wood forming machine adjacent the cutter head of the machine. The measuring device further includes a blade that is movably mounted to the elongated body adjacent an end thereof. The blade has a sharp edge configured to engage a cutter head. The measuring device also includes digital display operably connected to the blade and providing a visual readout corresponding to the position of the blade relative to the straight edge of the elongated body.

18 Claims, 3 Drawing Sheets

MEASURING DEVICE FOR WOOD CUTTING TOOL

CROSS-REFERENCE TO RELATED APPLICATIONS

This application claims the benefit of U.S. Provisional Application No. 60/360,811, entitled MEASURING DEVICE, filed Mar. 1, 2002, the entire contents of which are hereby incorporated by reference.

BACKGROUND OF THE INVENTION

Various wood molders have been developed for forming wood molding. Such molders include a rotating blade having a profile that provides the desired cross-sectional shape and surface contour in the finished molding. Proper operation of the molding machine requires that the height of the cutting blade be set at the proper height relative to the out feed bed plate of the machine.

Previously, adjustment of the cutting blade height relative to the out feed bed plate has been done using a conventional straight edge. However, proper adjustment utilizing a straight edge may be difficult.

SUMMARY OF THE INVENTION

One aspect of the present invention is a measuring device for setting up powered wood tools and the like. The measuring device includes an elongated body defining a straight edge adapted to abuttingly support the measuring device on a bed of the wood forming machine adjacent the cutter head of the machine. The measuring device further includes a blade that is movably mounted to the elongated body adjacent an end thereof. The blade has a sharp edge configured to engage a cutter head. The measuring device also includes digital display operably connected to the blade and providing a visual readout corresponding to the position of the blade relative to the straight edge of the elongated body.

BRIEF DESCRIPTION OF THE DRAWINGS

FIG. 1;

DETAILED DESCRIPTION OF PREFERRED EMBODIMENT

Figure 1:
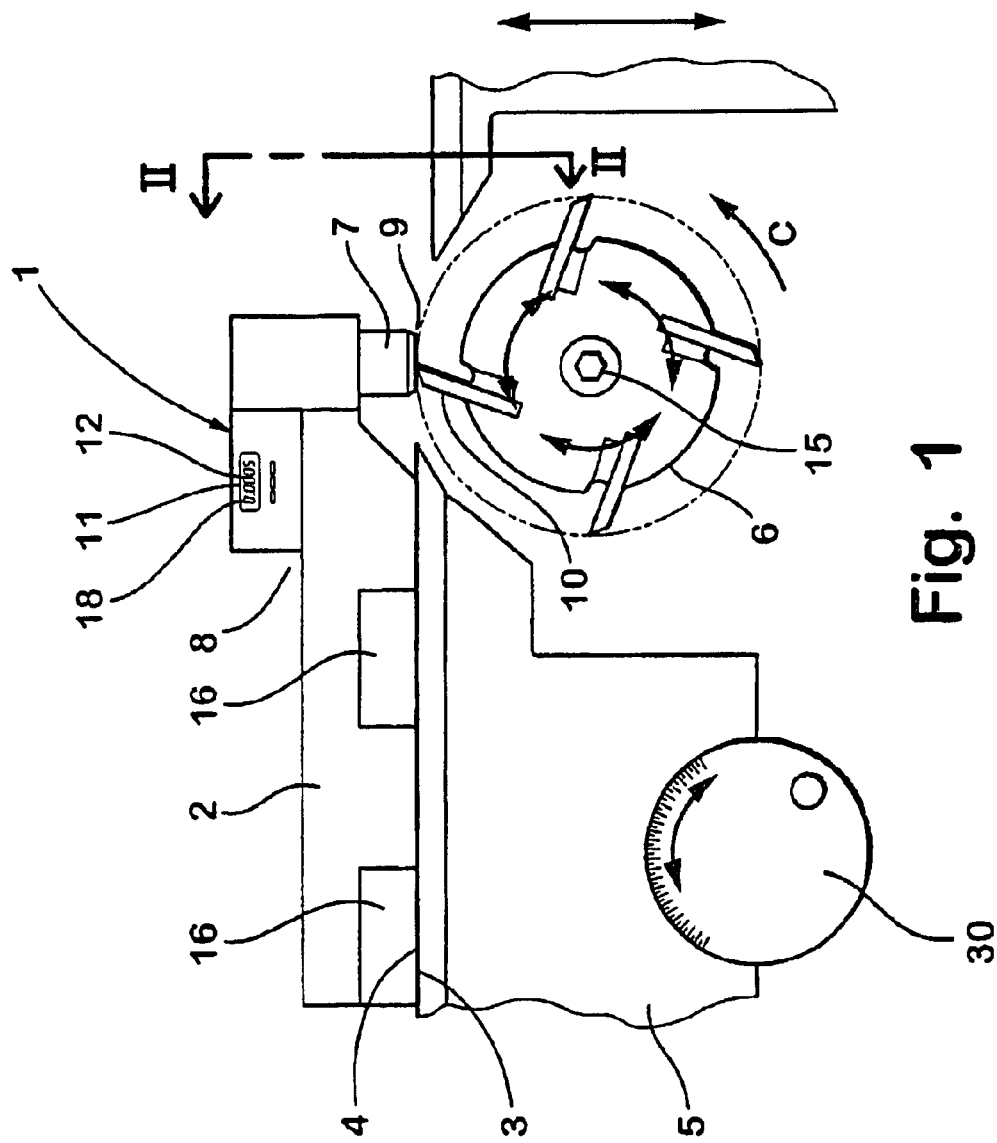
FIG. 1 is a partially schematic, fragmentary front elevational view showing a measuring device according to one aspect of the present invention in a use position on a wood molding machine.
Figure 3:
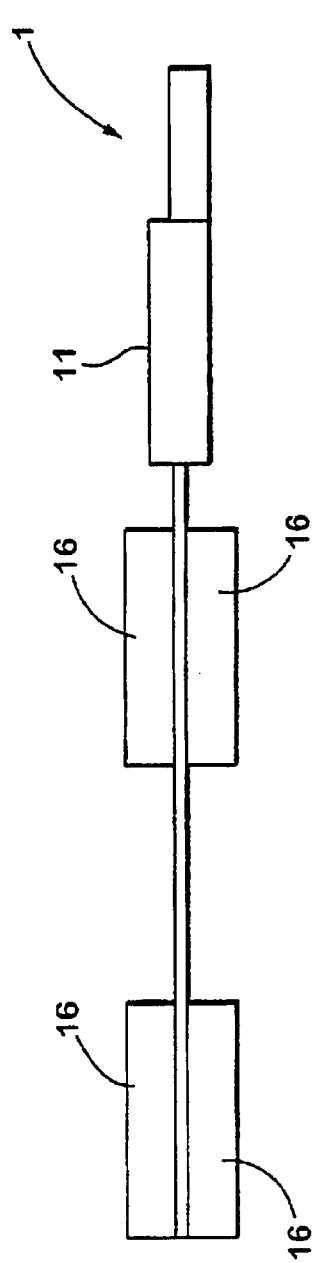
FIG. 3 is a top plan view of the measuring device of FIG. 1.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawing and described in the following specification are simply exemplary embodiments of the inventive concepts defined in the appended claim. Hence, specific dimensions and other physical characteristics relating to the embodiments disclosed herein are not to be considered as limiting, unless the claim expressly states otherwise.

Figure 2:
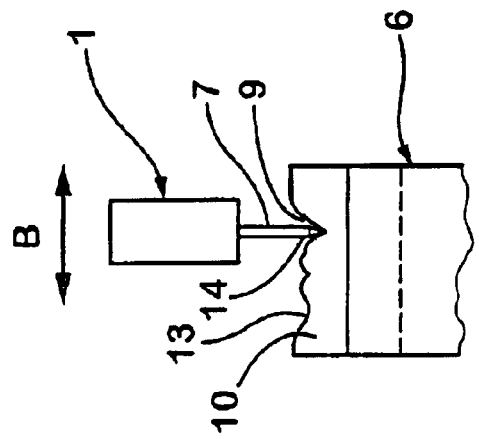
FIG. 2 is a partially schematic view of the measuring device and cutting blade of FIG. 1, taken along the line II—II.

A measuring device 1 (FIG. 1) according to the present invention includes an elongated body 2 defining a straight edge 3 adapted to abuttingly support the measuring device 1 on a bed 4 of wood forming machine 5 adjacent a cutting head 6 of the machine 5. One example of such a wood molding machine that the measuring device may be used with is a Weinig Unimat 220A wood molder that is commercially available from Weinig Corporation. A measuring blade 7 is movably mounted to the elongated body 2 adjacent a first end thereof. The measuring blade 7 includes a relatively sharp bull nose edge 9 (see also FIG. 2) configured to engage a blade 10 of the cutter head 6 of the wood forming machine 5. A display 11 is operably connected to the measuring blade 7, and provides a numerical visual readout 12 corresponding to the position of the measuring blade 7 relative to the straight edge 3 and bed 4.

Figure 4:
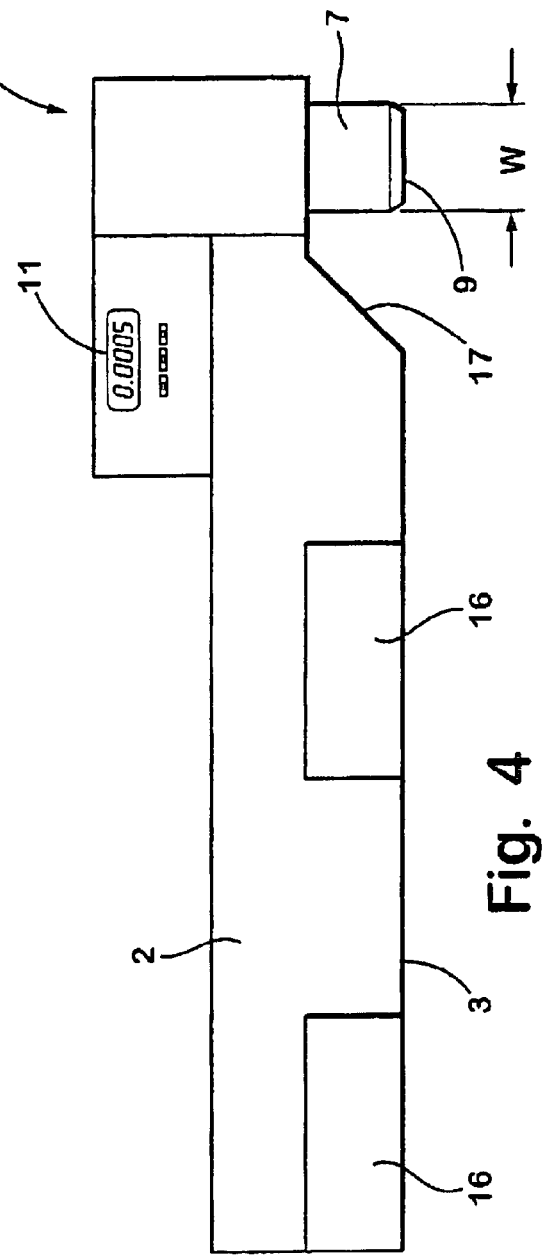
FIG. 4 is a front elevational view of the measuring device of FIG. 1.

Blade 10 of cutter head 6 has a sharpened knife edge 13 having a contour that provides the desired cross-sectional shape of the molding after the wood material is fed through the machine 5. The measuring blade 7 includes an edge 9 that extends into low spot 14 of blade edge 13. Also, measuring blade 7 has a width "W" (FIG. 4) that is relatively large, such that the measuring blade 7 can be readily placed above the axis of rotation 15 of cutter head 6 and contact the blade 10, even if the measuring blade 7 is not perfectly centered over axis 15. The elongated body 2 of measuring device 1 is cut out at 17, and the edge 9 of measuring blade 7 can extend above and below straight edge 3, such that the edge 9 of the measuring blade 7 can be utilized to measure the position of the cutter head 6 when the blade 10 is either above or below the bed surface 4. Also, a plurality of magnets 16 are provided to secure the measuring device 1 to the bed 4 during use. As described in more detail below, this arrangement facilitates "two handed" set up of the height of the cutting head 6.

Figure 5:
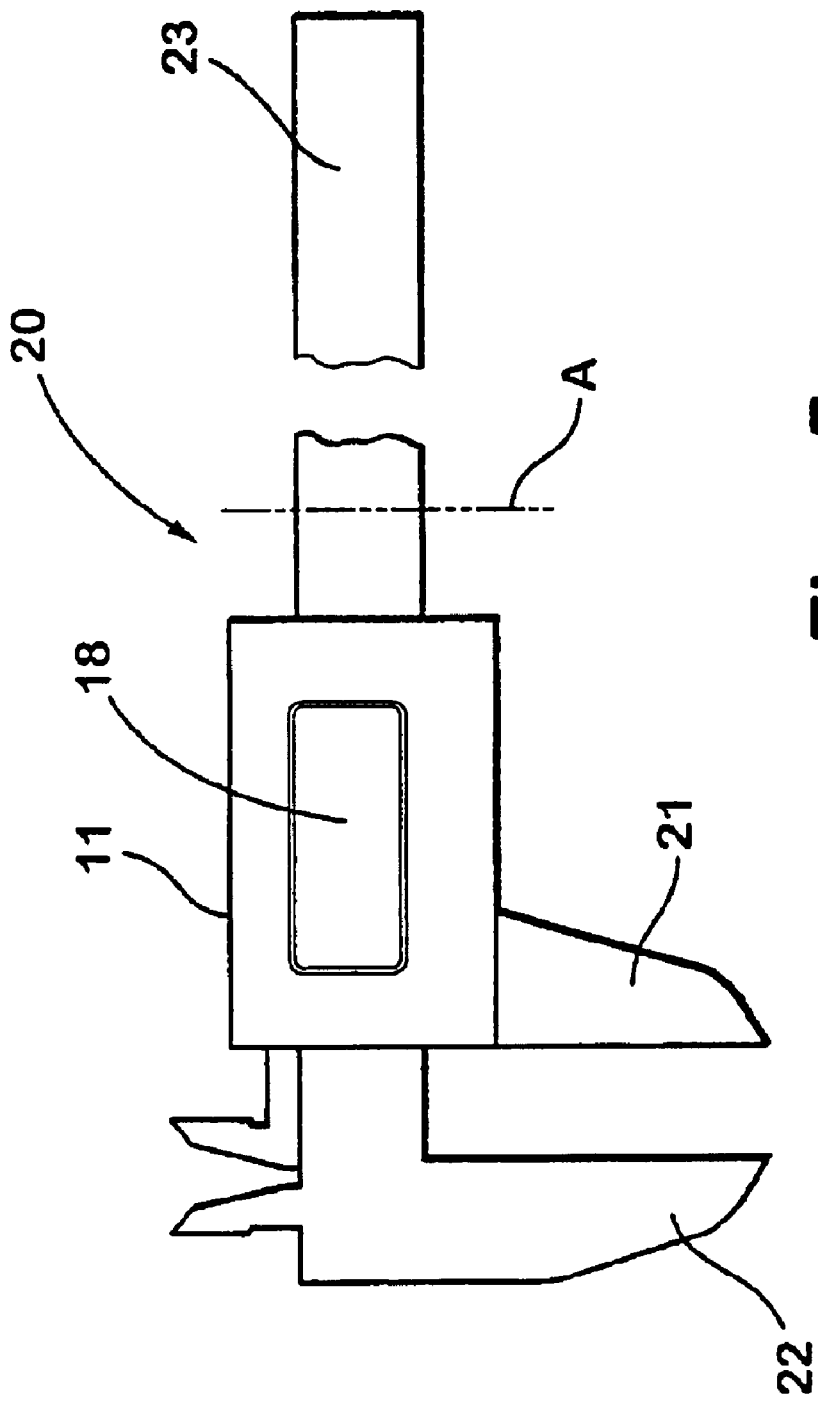
FIG. 5 is a schematic, fragmentary view of a digital caliper.

The digital display 11 includes an LCD display 18 providing a numerical readout of the position of the measuring blade 7 relative to the straight edge 3 and bed 4. In a preferred embodiment, the digital display 11 and LCD display 18 are from a Mitutoyo Series 500 Digital Calipers 20 (see also FIG. 5). The jaws 21 and 22 are removed, and the indicator 11 is rigidly secured to the elongated body 2. The elongated body 23 of the caliper 20 is cut at the line "A", and the edge 9 is formed at the cut, such that the remaining portion of the elongated body 23 forms the measuring blade 7.

During use, the measuring device 1 is placed on the bed 4 with the measuring blade 7 positioned above the bed 4. The edge 9 of measuring blade 7 is then brought into contact with the bed 4 to determine the zero reference point wherein the straight edge 3 and the edge 9 are at the same height. The measuring device 1 is then shifted so that the measuring blade 7 is positioned above the axis of rotation 15 of cutting head 6. The hand crank 30 is then rotated to raise the cutting head 6 until the blade 10 of cutting head 6 is proximate the measuring blade 7. The measuring device 1 is adjusted side-to-side as illustrated by the arrow "B" (FIG. 2) to align the knife edge 9 with the deepest groove 14 of edge 13 of blade 10. The cutting head 6 is then manually rotated in the direction of the arrow "C" (FIG. 1) to bring the blade 10 into contact with the edge 9 of measuring blade 7. The cutting head 6 is also slowly raised by manually rotating the hand crank 30, until a zero reading of the indicator is achieved when the blade 10 is at the uppermost position. The height of the head 6 is then locked.

Advantageously, the digital display showing the height of the head 6 can be monitored by the user while head 6 is being raised, such that the cutting head 6 can be stopped just at the zero reference point. Previously known methods of setting the cutter head 6 utilized a straight edge, and the cutter head would generally extend upwardly past the zero reference point before the user was able to detect the zero reference point position of the cutter head 6. The cutter head would then need to be shifted downwardly. However, downward movement of the cutter head causes backlash to develop in the worm gear (not shown) controlling the height of the cutter head 6, such that the cutter head would then need to be raised again slightly to eliminate the backlash. Thus, the known straight edge method of setting the cutter head height can be quite difficult and time consuming.

Furthermore, proper setting of the height of the cutter head 6 requires that cutter head 6 is raised at the same time the cutter head 6 is rotated to ensure that cutting blade 10 has reached the uppermost point. This requires simultaneous manual rotation of the cutter head 6, and manual rotation of the head crank 30. Because prior known methods for the setting the cutter head 6 required that the user manually grasp a straight edge, the user was not generally able to simultaneously also rotate the cutter head 6 and hand crank 30, adding to the difficulty of setting up the machine utilizing a straight edge. In contrast, the measuring device 1 of the present invention can be simply monitored by the user while the cutting head 6 is rotated, and the hand crank 30 is also rotated, substantially improving the set up process.

The measuring device 1 of the present invention facilitates rapid and accurate set up of the height of the cutting head 6. Furthermore, the sharp edge 9 permits measurement at the deepest point in the contour of the cutting blade head, ensuring that the cutting head 6 is set at the proper height relative to the bed of the wood forming machine. Still further, the measuring blade 7 of the measuring device 1 is relatively wide, such that the measuring device 1 can be readily positioned above the axis of rotation of the cutting head to provide an accurate measurement of the position of the cutting head. The measuring device 1 is compact, permitting use in modern wood molding machines having limited space in the bed area. Also, the measuring device 1 of the present invention permits measurement of the height of the cutting blade when the blade is both below and above the bed height, thereby permitting the user to stop upward movement of the cutter head 6 as the cutter head 6 approaches the zero reference point. Thus, the measuring device 1 eliminates the need to shift the cutter head down and back up to remove the backlash from the ball screw controlling the height of the cutter head.

In the foregoing description, it will be readily appreciated by those skilled in the art that modifications may be made to the invention without departing from the concepts disclosed herein. Such modifications are to be considered as included in the following claim, unless this claim by its language expressly states otherwise.

The invention claimed is:

1. measuring device for setting up powered wood cutting tools, comprising:
   a body defining a support surface adapted to abuttingly support the measuring device on a bed of a wood forming machine adjacent a cutter head of the wood forming machine;
   a blade movably mounted to the body, the blade having a sharp edge configured to engage a blade of a cutter head; and
   a display operably connected to the blade and providing a visual readout corresponding to the position of said blade relative to the support surface of the body.

2. The measuring device of claim 1, including:
   at least one magnet on the elongated body to hold the measuring device on a bed of a wood forming machine.

3. The measuring device of claim 1, wherein:
   the display comprises a measuring device having a digital readout.

4. The measuring device of claim 1, wherein:
   the sharp edge of the blade is movable to positions above and below the support surface.

5. The measuring device of claim 4, wherein:
   the support surface comprises a straight edge.

6. The measuring device of claim 5, wherein:
   the body includes a cutout portion at the end adjacent the blade to provide clearance for a blade of a powered wood cutting tool.

7. The measuring device of claim 1, wherein:
   the sharp edge of the blade is straight.

8. The measuring device of claim 1, wherein:
   the body is an elongated and defines and end, the blade being mounted to the body at the end, and wherein the blade translates linearly.

9. The measuring device of claim 1, including:
   a plurality of magnets secured to the body and forming at least a portion of the support surface.

10. A measuring device, comprising:
    a body defining a support surface adapted to abuttingly support the measuring device n a bed of a wood forming machine adjacent a cutter head of the wood forming machine;
    at least one magnet for holding the body on a metal surface;
    a measuring member movably mounted to the body, the measuring member having a sharp edge;
    an indicator operably connected to the measuring member and providing an indication of the position of the measuring member relative to the support surface of the body.

11. The measuring device of claim 10, wherein:
    the indicator comprises a measuring device having a digital readout.

12. The measuring device of claim 11, wherein:
    the sharp edge of the blade is movable to positions above and below the support surface.

13. The measuring device of claim 12, wherein:
    the support surface comprises a straight edge.

14. The measuring device of claim 13, wherein:
    the sharp edge of the measuring member is straight.

15. The measuring device of claim 14, wherein:
    the body is an elongated and defines an end, the measuring member being mounted to the body at the end, and wherein the measuring member translates linearly.

16. A measuring device for adjusting the height of a cutting wheel of a wood cutting machine, comprising:
    an elongated straight edge member defining an end;
    a plurality of magnets mounted to the straight edge for securing the measuring device to a flat metal surface;
    a measuring device mounted to the straight edge adjacent the end, the measuring device including a movable member having a sharp edge and a display showing the position of the movable member relative to the straight edge member; and wherein:
    the sharp edge is straight.

17. The measuring device of claim 18, wherein:
    the display comprises a digital readout.

18. The measuring device of claim 19, wherein:
    the straight edge defines a support surface, and the sharp edge is movable to a position below the support surface.

* * * * *